(12) United States Patent
Linda et al.

(10) Patent No.: US 8,907,612 B2
(45) Date of Patent: Dec. 9, 2014

(54) INVERTER FOR DRIVING AN ELECTRIC MOTOR COMPRISING AN INTEGRATED REGULATOR

(75) Inventors: Jean-Louis Linda, Impasse-du-Ruisseau (CH); Pierre Alain Magne, La Ria (CH); Cédric Savio, Au Pontet (CH)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 188 days.

(21) Appl. No.: 13/511,309

(22) PCT Filed: Nov. 10, 2010

(86) PCT No.: PCT/EP2010/067185
§ 371 (c)(1),
(2), (4) Date: Jun. 12, 2012

(87) PCT Pub. No.: WO2011/064095
PCT Pub. Date: Jun. 3, 2011

(65) Prior Publication Data
US 2012/0249044 A1    Oct. 4, 2012

(30) Foreign Application Priority Data
Nov. 26, 2009 (FR) ...................... 09 58404

(51) Int. Cl.
*H02P 6/04* (2006.01)
*B60L 15/10* (2006.01)
*B60L 11/18* (2006.01)

(52) U.S. Cl.
CPC ............... *B60L 15/10* (2013.01); *Y02T 10/705* (2013.01); *Y02T 10/7005* (2013.01); *B60L 11/1851* (2013.01)

USPC ........................................... 318/722
(58) Field of Classification Search
CPC ......... H02J 1/102; G01R 35/00; G01R 27/26; G01R 31/3651; G01R 3/00; H02M 1/32; H02M 3/157; H02P 3/02; H02P 6/08; H02P 6/142; H02P 25/021; H02P 25/023
USPC ............ 318/139, 148, 153, 140, 700, 400.01, 318/800, 801, 722; 320/132, 149, 155, 135
See application file for complete search history.

(56) References Cited

U.S. PATENT DOCUMENTS 5,172,784 A * 12/1992 Varela, Jr. ................ 180/65.245
5,481,168 A    1/1996 Mutoh et al. .................. 318/432

(Continued)

FOREIGN PATENT DOCUMENTS

EP    1 410 942 A2    4/2004
EP    1 695 862 A2    8/2006

*Primary Examiner* — Rita Leykin
(74) *Attorney, Agent, or Firm* — Fitzpatrick, Cella, Harper & Scinto

(57) ABSTRACT

A driving inverter for a multi-phase electric motor includes an alternating current (AC) generator, at least one AC sensor, a power supply line, a current sensor, an input, and a controller. The AC delivers current to a terminal block that is connectable to the phases of the electric motor. The at least one AC sensor is arranged on a certain phase or certain phases powering the electric motor. The current sensor is arranged on the power supply line and senses a current thereon. The input receives information that includes a torque demand setpoint and at least one limit current value of a power source. The controller drives phase currents of the electric motor according to the torque demand setpoint and by keeping the current of the power supply line at an acceptable value according to the at least one limit current value of the power source. With the arrangement of the driving inverter, a maximum current can always be imposed on the power source with no risk of degrading it.

12 Claims, 2 Drawing Sheets

(56) References Cited

U.S. PATENT DOCUMENTS

| | | | |
|---|---|---|---|
| 5,583,406 A * | 12/1996 | Mutoh et al. | 318/376 |
| 5,600,215 A * | 2/1997 | Yamada et al. | 318/139 |
| 6,480,767 B2 * | 11/2002 | Yamaguchi et al. | 701/22 |
| 6,573,675 B2 * | 6/2003 | Schmitz et al. | 318/434 |
| 6,657,356 B2 | 12/2003 | Laurent et al. | 310/254 |
| 6,756,710 B2 | 6/2004 | Bourqui et al. | 310/44 |
| 6,885,920 B2 * | 4/2005 | Yakes et al. | 701/22 |
| 6,973,880 B2 * | 12/2005 | Kumar | 105/35 |
| 7,096,098 B2 | 8/2006 | Auguet et al. | 701/22 |
| 7,855,526 B2 * | 12/2010 | Ohnishi et al. | 318/800 |
| 8,127,874 B2 * | 3/2012 | Suzui | 180/65.265 |
| 2003/0088343 A1 | 5/2003 | Ochiai et al. | 701/22 |
| 2007/0257627 A1 | 11/2007 | Palandre et al. | 318/432 |
| 2009/0234525 A1 | 9/2009 | Bourqui et al. | 701/22 |
| 2009/0256415 A1 | 10/2009 | Bourqui et al. | 303/3 |
| 2009/0272608 A1 | 11/2009 | Bourqui et al. | 188/160 |
| 2010/0065386 A1 | 3/2010 | Bourqui | 188/159 |
| 2010/0256887 A1 | 10/2010 | Linda et al. | 701/82 |
| 2010/0324766 A1 | 12/2010 | Linda et al. | 701/22 |
| 2011/0046830 A1 * | 2/2011 | Bourqui et al. | 701/22 |
| 2011/0295457 A1 | 12/2011 | Linda et al. | 701/29 |

* cited by examiner

INVERTER FOR DRIVING AN ELECTRIC MOTOR COMPRISING AN INTEGRATED REGULATOR

FIELD OF THE INVENTION

The present invention relates to the driving of electric motors. More specifically, it relates to the driving of the electric motors used in particular for vehicle traction.

STATE OF THE ART

It is known that such a motor comprises, on the stator, a magnetic circuit and windings of electricity conducting wire capable of generating a stator magnetic flux. In the case of a synchronous motor, on the rotor, the motor comprises permanent magnets and a magnetic circuit generating a rotor magnetic flux. In the case of an asynchronous motor, the motor comprises a squirrel cage rotor. In the case of a reluctant motor, the motor comprises a reluctant rotor. In many applications for electric vehicles, synchronous motors are used. Such a motor is equipped with a "resolver" giving the position of the rotor relative to the stator. Such a motor is always associated with an inverter to drive it.

Those skilled in the art know that, in practice, electric motors are reversible machines, in other words they also operate as alternators. This is why it is also commonplace to speak of electric machines. When the text below refers to a motor, it is a language convenience, it being understood that, in the context of the present invention, an electric machine is covered in general, and that it operates both as motor or as alternator.

In very many applications, notably in motor vehicles, the electrical energy source is a direct current source such as a battery or a fuel cell. In this case, the inverter driving the motor comprises an inverter transforming the DC signal into an AC signal with amplitude and frequency adapted to the operating setpoints of the motor. The role of the three-phase inverter associated with a motor is to generate a desired mechanical torque at the motor shaft output from a DC power supply.

As an illustration of the state of the art, the patent application US 2003/0088343 can be cited, which describes an electric traction chain for a hybrid motor vehicle equipped with an internal combustion engine and an electric motor which provides assistance for the motor drive of the vehicle. The electric motor is itself powered by a battery. As for the driving of the motor, this document describes a principle based on a limiting of the torque according to the battery limit power. It refers to a maximum discharge power. Also described is the use of a battery current sensor used to control the discharge power, and a battery temperature sensor for determining a battery limit power according to a pre-established map of the power as a function of the temperature, but this arrangement does not allow for very dynamic regulation functions.

In the field of purely electrical traction vehicles, the U.S. Pat. No. 5,600,215 can be cited which describes a controller for a battery-powered electric vehicle. This patent provides for a regulation of the torque of the electric motor according to the battery voltage. However, this principle does not allow for a very good control of the current in the case of certain types of battery, such as Li-Ion batteries, for example, the use of which is tending to increase. The voltage of the Li-Ion batteries in fact depends on numerous factors (temperature, state of charge, ageing) and correctly regulating a discharge current in this way is highly problematical. Furthermore, in the description of this document, the limit voltage of the battery is a predefined fixed value, not updated according to the trend of the state of charge, the temperature, etc., hence a fairly rough regulation.

In most of the applications that require high power levels, three-phase machines are used. The operating principle is as follows: the interaction between the stator magnetic field of the motor, created by the current in the winding, and the rotor magnetic field, produces a mechanical torque. From the DC voltage of the power supply, the inverter, by virtue of three power transistor branches, produces a system of three-phase currents of appropriate amplitude, of appropriate frequency and of appropriate phase relative to the rotor field, to power the three phases of the motor. In order to control the amplitude of the currents, the inverter has current sensors providing information on the currents of each phase of the motor. To control the frequency and the phase of the currents, the inverter receives the signals from a resolver which measures the position of the rotor relative to the stator.

The general controller is equipped with a modelling of the motor which provides a precise knowledge of the phase currents to be produced to obtain the desired motor torque. The inverter, based on the modelling of the motor, determines the setpoints of the motor phase currents and produces them using its regulators. The inverter does not therefore servocontrol the torque, but the current of the motor. Depending on the different operating conditions (temperature of the motor, temperature of the inverter, length of the cables) and the diversification of manufacture of the inverters and the motors, for a given motor current, the losses of the motor, of the inverter and of the cables may vary. Consequently, the power, and therefore the current absorbed on the source, may differ from one case to another.

Consequently, it is necessary to model the losses of an inverter-motor system selected as a reference, the modelling being done at a given temperature. The temperature is usually chosen to be rather high so as to overestimate the losses of the motor, these being, out of all the losses, those which are the most dependent on temperature. In this way, for a given torque setpoint, the current to be taken from the current source is overestimated to guarantee that the current does not exceed the current that can be accepted by the source.

Another example of regulation based on a modelling can be found in the patent application EP 1410942. This also describes a controller for a battery-powered electric vehicle. In particular, it describes a limiting of the consumption of the source current via the motor drive, said limiting being based on a modelling of the motor, that is to say, the creation of a map of the motor according to different parameters.

This approach is not optimal because it is difficult to perform a modelling that is sufficiently representative of all the elements in all cases of use. In practice, modellings are produced on a laboratory bench and not on a vehicle or, even if modellings are performed on a vehicle, not all the cases of use thereof are covered, not to mention taking into account the ageing of the components in the modelling.

The result of this approach (modelling) is therefore that the full power of the source is not used in the cases where the real losses are lower than the estimated losses (low temperature for example) and it does not take account of the ageing and therefore the loss of efficiency of the inverter or of the motor. Thus, the maximum performance levels are not guaranteed in all conditions.

The objective of the invention is to dispense with the need to model the losses and to propose means for providing a better driving of the motor.

BRIEF DESCRIPTION OF THE INVENTION

The invention proposes an inverter for driving an electric motor, the motor comprising a stator having at least two phases and a rotor, said inverter comprising:
- two terminals for connecting to a DC bus associated with a direct current electrical energy source and a DC electric voltage,
- an alternating current generator delivering a current to a terminal block intended to be connected to the phases of said electric motor,
- a power supply line between the connection terminals and the generator,
- a power supply current measurement line on which circulates a measurement of the current on the power supply line,
- at least one motor current measurement line on which circulates a measurement of the alternating current on certain power supply phases of said electric motor so as to know the alternating current circulating in each of the phases,
- an input receiving information comprising at least one "source limit current" value for the current circulating on the power supply line, and a torque demand setpoint (Ccons),
- a controller receiving the current measurements on the power supply line, the measurements of the phase currents of the electric motor, the limit currents of the source (Idc max and Idc min), the torque demand setpoint (C CAN), the controller being used to drive the phase currents of the electric motor according to the torque demand setpoint by keeping the current flowing via the power supply line at a value compatible with the limits of the source.

In a particularly interesting implementation when the invention is applied to the driving of vehicle traction motors, the "limit current of the source" comprises a maximum current setpoint (of positive sign) corresponding to a current drawn from the electrical energy source when the motor is operating in traction mode and a minimum current setpoint (of negative sign) corresponding to a current returned over the direct current bus, generally to recharge the electrical energy source, when the electric motor is operating in regenerative braking mode.

BRIEF DESCRIPTION OF THE FIGURES

The rest of the description provides a good understanding of all aspects of the invention through the appended drawings in which.

DESCRIPTION OF BEST EMBODIMENTS OF THE INVENTION

Figure 1:
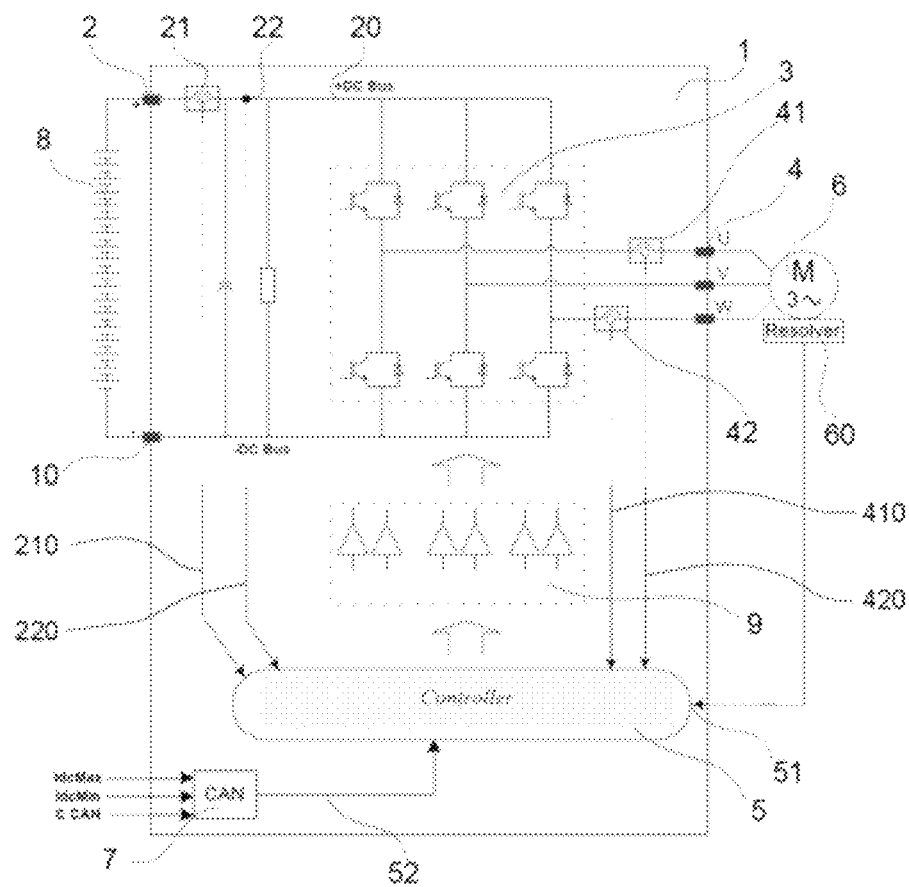
FIG. 1 illustrates an inverter according to the invention.

FIG. 1 shows an inverter 1, a three-phase electric motor 6, a battery 8 forming the DC electrical energy source and a CAN® bus 7 over which circulates information used by the inverter 1. The three-phase electric motor comprises a stator that has at least three phases U, V, W and a rotor.

The inverter 1 has two terminals 2 and 10 for connecting to a direct current bus (DC bus) associated with a direct current and DC electric voltage electrical energy source. It comprises an alternating current generator 3 delivering a current to a terminal block 4 intended to be connected to the phases U, V and W of said electric motor 6. The inverter 1 comprises a power supply line 20 between the terminal 2 and the current generator 3. The inverter 1 comprises a controller 5 and a driving stage 9 receiving driving commands from the controller 5 and handling the driving of the power transistors of the current generator 3.

In a preferred implementation of the invention, in order to allow for a driving with excellent performance levels, the rotor of the electric motor 6 is a synchronous motor and is associated with a resolver 60 which gives the relative position between rotor and stator. The inverter 1 then comprises an input 51 receiving the signal delivered by said resolver. However, this arrangement is not limiting; those skilled in the art know that there are algorithms which can be used, based on phase current and voltage measurements, to estimate the position of the rotor relative to the stator.

As was seen in the introductory part of this patent application, one of the essential characteristics of the present invention is that there is a controller which makes it possible to drive the phase currents of the electric motor according to the torque demand setpoint and keeping the current flowing via the power supply line to a value that is compatible with the limits of the source. To this end, in the nonlimiting implementation described in this document, the inverter comprises another power supply voltage measurement line 220 on which circulates a measurement of the voltage on the power supply line 20, and the controller 5 also receives the measurement of the voltage on the power supply line 20. It is in fact advantageous to implement, in the controller, a regulation law which uses the power supply voltage in its parameters. The controller 5 also receives the signals from the resolver 60. Based on this information, the controller 5 determines a driving torque (Cpil) for the electric motor to drive the phase currents of the electric motor, so that said driving torque (Cpil) is identical to the torque demand setpoint (Ccons) as long as the current on the power supply line 20 remains distant from the limit current of the source and, when the current on the power supply line 20 reaches the limit current of the source, said driving toque (Cpil) is reduced relative to the torque demand setpoint (Ccons) so as not to exceed the limit current of the source on the power supply line 20.

Very advantageously, a number of sensors are directly incorporated in the inverter according to the invention. However, it should be understood that what is essential to the invention, is not the incorporation of the sensors per se, but the fact that the signals that they deliver are used directly as parameters for the regulation performed by the inverter. That said, the inverter incorporates a current sensor 21 on the power supply line, said current sensor 21 delivering its measurement on said power supply current measurement line 210. The inverter also incorporates a voltage sensor 22 of the power supply line, said voltage sensor 22 delivering its measurement on said power supply voltage measurement line (220). The inverter also incorporates an alternating current sensor, more specifically two alternating current current sensors 41, 42 installed on certain phases powering said synchronous electric motor 6, namely on the phases U and W, the current on the phase V being the sum of the phase U and phase W currents. These alternating currents power the synchronous electric motor 6. Said alternating current sensors 41, 42 deliver their measurements on two (410, 420) of said at least one motor current measurement lines.

The inverter 1 comprises a current sensor 21 on the power supply line 20, and a voltage sensor 22. The inverter 1 also comprises an input 52 receiving information circulating on the CAN® bus 7. This information includes the limit current setpoint Idc max of the source (setpoint of positive sign) corresponding to a current drawn from the electrical energy source when the motor is operating in traction mode and the minimum current setpoint Idc min of the source (setpoint of negative sign) corresponding to a current returned to the electrical energy source when the electric motor is operating in regenerative braking mode. The latter is the most intense recharging current that the source can accept.

It should be stressed that the current setpoints are themselves permanently calculated according to the state of the vehicle. When the current returned to the source can only be absorbed by said source, it is a recharging current whose limit value depends on the state of charge of the source and on its technology. For example, a lead battery accepts only low recharging currents whereas a bank of supercapacitors accepts high recharging currents identical to the discharge currents. Lithium polymer batteries or Lithium Ion batteries accept fairly high charging currents that are lower than the discharge currents. To sum up, the determination of "source limit current" values depends on the electrical accumulator technology used, on the state of charge of the accumulator and on the vehicle conditions, all things that are outside the scope of the present invention. Said values constitute input data that the present invention makes it possible to exploit shrewdly.

The inverter 1 comprises a controller 5 which receives the signals from the voltage sensor 22 on the power supply line 2, from the current sensor 21 on the power supply line 2, from the resolver 60, the signals concerning the current of each phase of the synchronous electric motor by virtue of the sensors 41 and 42, the limit currents Idc max and Idc min of the battery 8, the torque demand setpoint C CAN as desired also circulating on the CAN® bus 7.

Figure 2:
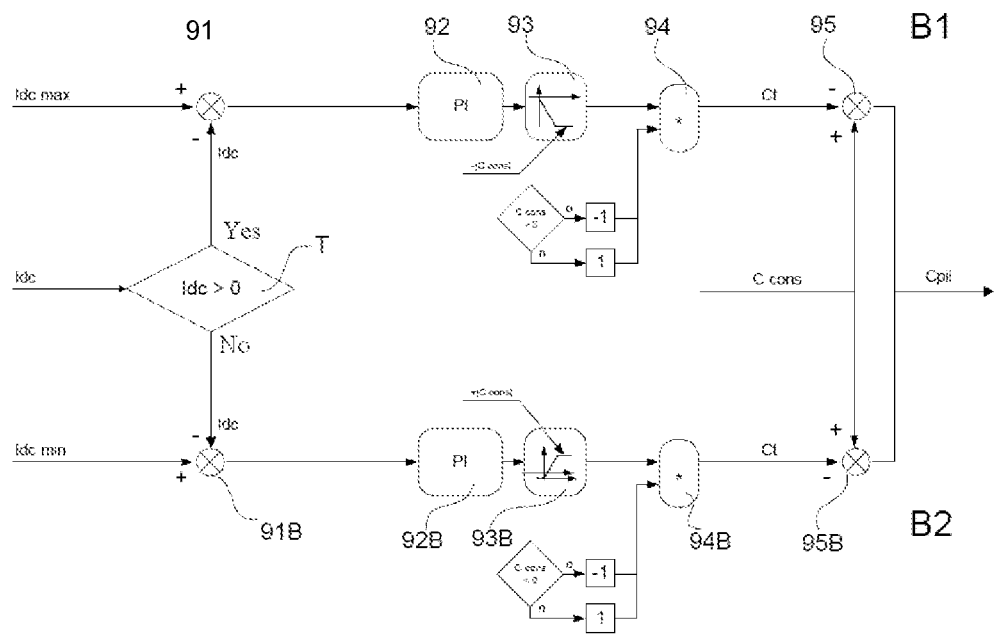
FIG. 2 is a block diagram representing a specific treatment of the inverter of the invention.

FIG. 2 shows that the controller 5 comprises a bus current regulator acting on the torque setpoint Cpil, this regulator comprising a processing branch B1 receiving the maximum current setpoint Idc max, a processing branch B2 receiving the minimum current setpoint Idc min and a test module T for switching between one or the other line depending on the sign of the current.

The current flowing on the power supply line 20 is measured by the current sensor 21 (see FIG. 1) which communicates the measurement Idc of the current to the test module T which, in turn and depending on the sign of the current, sends the measurement Idc over the branch B1 if the value is positive, that is to say that the motor 6 is operating in traction mode, or over the branch B2 if the value is negative, that is to say operating in regenerative braking mode.

A measurement of the current of two of the three phases of the motor 6 is also taken by a sensor 41 on the phase U of the motor 6 and by a sensor 42 on the phase W of the motor 6. These current values are communicated to the controller which calculates the current on the phase V.

Moreover, the controller transforms the torque demand setpoint C CAN into a driving torque setpoint Cpil for the motor 6 as will be explained below, and then transforms this driving torque Cpil into a motor phase current value in a conventional manner and in a way that is well known to those skilled in the art.

Returning to FIG. 2 and considering first of all the branch B1, this branch corresponds to the motor mode operation in which the inverter consumes current from the source. It is assumed that the torque setpoint Ccons is identical to the torque demand point C CAN circulating on the CAN® bus. The driving torque setpoint Ccons is positive (Ccons>0) when moving forward or it is negative (Ccons<0) when the driver of the vehicle has selected reverse. Incidentally, note that the resolver 60 communicates to the controller 5 an information item which tells the latter the speed of the vehicle, with its sign, therefore telling it the direction of movement of the vehicle. Then, by comparing the signs of the desired torque C CAN on the one hand and of the vehicle speed on the other hand, the controller 5 can determine whether it is operating in traction mode or in braking mode.

A summer 91 receives, on the one hand, the limit current setpoint Idc max of the source and on the other hand the current measurement Idc and delivers the current difference relative to the source limit current value. Said difference is processed by a "Proportional Integral" regulator 92 and by an amplitude limiter 93 which limits the result after the proportional integral regulator 92 to the value "minus the absolute value of the setpoint torque Ccons". The result, possibly limited by the amplitude limiter 93, then passes through a "torque sign" module 94 which keeps the sign of the result or changes it, depending on whether the initial torque setpoint wanted by the driver of the vehicle is a torque tending to increase the vehicle displacement movement forward (positive sign) or to increase it in reverse (reverse movement, negative sign) to obtain the result Ct. The result Ct enters into a summer 95 which also receives the torque setpoint value Ccons and delivers a driving torque setpoint Cpil to drive the torque of the electric motor 6.

Thus, if in traction mode (positive setpoint toque, assumed to be close to the maximum torque for the reasoning, branch B1), if the current Idc max is 100 A, and if the measured current is 105 A, beyond the limit, the summer 91 delivers a negative value −5 A, the amplitude of which is proportional to the overshoot, transformed into a difference torque with a value proportional to the overshoot and with a "minus" sign by the proportional integral regulator 92. Then, the sign of the difference torque is inverted by the "torque sign" module 94 because the motor is in traction mode. After the summer 95, the difference torque Ct is subtracted from the setpoint torque Ccons to give a motor driving torque Cpil that is reduced to take account of the overshoot beyond the current that can be accepted by the source. In all the cases where the output of the proportional integral regulator 92 is a zero value, the output of the amplitude limiter 93 is a zero value, the output of the "torque sign" module 94 is a zero value and the driving torque Cpil remains identical to the torque setpoint Ccons. If the current Idc is positive while the torque setpoint is negative (the vehicle is in reverse and in motor operating mode), then the regulator increases (that is to say makes it tend towards zero) the setpoint to reduce the consumption on the source.

The branch B2 corresponds to the operation in regenerative braking mode in which the inverter injects current to the source. The torque setpoint Ccons is positive (Ccons>0) in reverse operation or it is negative (Ccons<0) in forward operation. The operating principle is identical. In forward operation, the torque setpoint Ccons is less than zero; the output of the proportional integral regulator 92B is, this time, positive; the "torque sign" module 94B reverses the sign this time when the torque setpoint is negative.

In all the cases in the Figures, the mechanism tends to reduce (as an absolute value) the resultant torque setpoint, called driving torque, relative to the (original) torque setpoint.

The power consumed on the source for a given motor current varies according to a large number of parameters. Even if it is possible to model the influence of each parameter (temperature, length and type of cable, ageing) on the losses, this work has to be repeated at least on each motor and on each electronic system. Furthermore, all these modellings have to be implanted in a central processing unit which has to calculate in real time that the torque setpoint that it demands of the inverter does not generate losses, and therefore a power, and ultimately a current consumed on the source which is unacceptable to the latter. This is true when the inverter-motor system is current consumer, but it is also true when this system is generator. In this second case, it is also essential to check that the current injected to the source is acceptable. Unlike the approach described above, the present invention makes it possible, at any time, independently of the level of losses in the driven electric motor and in the inverter itself, without having to revert to a calibration, in a way that is auto-adaptive to the drift of the components that might cause a variation of said losses, to always be able to draw the maximum current acceptable from the source, or to inject to it the maximum recharging current that it allows without damaging said direct current source. Consequently, the overall power of the inverter-motor system, that is to say, for example, of the electric traction system installed on a vehicle, is optimized without having to adopt, in the dimensioning, excessive safety coefficients which would be prejudicial, given equal power, to the weight of the system, or given equal safety coefficient, while reducing the risk of damage.

The fact of having added a measurement of the bus current now makes it possible to implement control of this current within the inverter. In effect, an internal regulator in real time modifies the driving of the motor in order to observe a maximum source current (consumed on the source) or minimum source current (injected to the source).

The management of the system is greatly simplified. There is no longer a need to know the characteristics of the motor, inverter, cable elements. A central processing unit of the vehicle (not represented) sends via the CAN® bus 7 to the inverter two bus current setpoints: maximum bus current (Idc Max>0) and minimum bus current (Idc Min<0). The inverter 1 observes the torque setpoint coming from a central processing unit of the vehicle while the bus current remains between the Idc Min and Idc Max values. When the bus current regulator is working not to exceed these limits, the torque setpoint is no longer observed. Advantageously for the overall management of the vehicle, the inverter 1 permanently sends (via the CAN® bus 7) to the central processing unit of the vehicle, the value of the torque actually generated.

Figure 3:
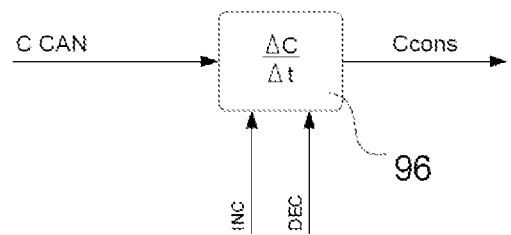
FIG. 3 is a block diagram of an additional device of the inverter of the invention.

In an implementation of the invention that is particularly advantageous to ensure a suitable operation of a motor vehicle with electric traction, a processing of the torque demand setpoint C CAN is added to the controller 5 to obtain a reprocessed driving torque setpoint Ccons, this processing being illustrated in FIG. 3. In FIG. 3, it can be seen that the controller includes a "torque ramp" block 96 receiving as input the torque setpoint C CAN coming via the CAN® communication network 7 (see FIG. 1), receiving an INC state indicating that the increase in torque is allowed, receiving a DEC state indicating that the decrease in torque is allowed, and delivering the setpoint torque Ccons actually used in the processing illustrated by means of FIG. 2.

In normal operation of the vehicle, that is to say, when the Idc current has not reached one of the limits, the outputs of the proportional integral regulator 92 and amplitude limiter 93 assembly and the proportional integral regulator 92B and amplitude limiter 93B assembly are zero values, which activate the INC state if C CAN>Ccons, or which activate the DEC state if C CAN<Ccons. In this case, as long as the torque demand setpoint C CAN is greater than the driving torque setpoint Ccons (C CAN>Ccons), Ccons is incremented by $\Delta C/\Delta T$ according to a chosen ramp and, in the same way, as long as the torque demand point C CAN is less than the driving torque setpoint Ccons (C CAN<Ccons), Ccons is decremented by $\Delta C/\Delta T$ according to a chosen ramp; this makes it possible to obtain a highly progressive operation of the vehicle even though the variation of the torque demand setpoint C CAN may be abrupt, and above all it is transmitted in successive levels because it is refreshed for example every 20 milliseconds.

In constrained operation of the vehicle, that is to say when the Idc current has reached one of the limits, one of the outputs of the proportional integral regulator 92 and amplitude limiter 93 assembly or of the proportional integral regulator 92B and amplitude limiter 93B assembly is a value other than zero, which deactivates either the INC state or the DEC state depending on whether the inverter is energy consumer or generator and whether the vehicle is running forward or in reverse. To sum up, there are four cases:

i) running forward and energy consumer, INC is prohibited;

ii) running forward and energy generator, DEC is prohibited;

iii) running in reverse and energy consumer, DEC is prohibited;

iv) running in reverse and energy generator, INC is prohibited.

In other words, the driving torque setpoint Ccons is prohibited from continuing to increase, whatever the increase in the torque demand setpoint C CAN so as not to tend to increase the Idc current consumption and therefore increase the "load" even more on the proportional integral regulator 92 and amplitude limiter 93 assembly which, in any case, cannot allow a torque setpoint Ccons greater than that reached when said proportional integral regulator 92 and amplitude limiter 93 assembly is called into operation. On the other hand, the driving torque setpoint Ccons is allowed to decrease.

In conclusion, it can be stated that the invention also allows for checks on the correct operation of the inverter-motor system. In practice, consumed (or generated) power consistency checks can be performed between the input of the inverter on the power supply line 20 and the output of the inverter 1 on the phases U, V, W of the motor 6. Furthermore, the current sensor 21 makes it possible to calculate in real time the efficiency of the inverter 1. Furthermore, the invention makes it possible to carry out consistency checks. For example, if the resolver 60 of the motor 6 is accidentally offset, the current mode servocontrol of the motor will operate normally but the stator magnetic field will not be phased correctly relative to the rotor. The torque actually generated will be lower than the setpoint torque. We should stress that this consistency check is possible even if the torque is not measured. The mechanical power at the output of the motor 6 is the product of the mechanical torque by the rotation speed. The electrical power consumed at the input of the inverter should correspond to the mechanical power with losses added. By virtue of the measurement of the voltage and of the current of the power supply line 20, this electrical power is known and makes it possible to estimate a mechanical power (by subtracting a plausible losses value), which makes it possible to estimate the mechanical torque on the output shaft of the motor. It is then possible to compare this mechanical torque to the torque setpoint. A difference beyond an experimental threshold can be used to activate a warning, and it is possible to propose, as an aid to troubleshooting, possible causes including a fault involving the resolver 60 or a phase current sensor or the DC bus, the DC bus voltage measurement, etc.

To sum up, it should be stressed that the present invention makes it possible to control the current drawn (or injected) by the inverter on the electrical energy source by virtue of a regulator acting on a quantity influencing the consumed power. It involves acting on the motor torque in order to reduce the power drawn (or injected) at the inverter input and consequently reduce the current consumed. Whatever the type of motor, the inverter incorporates a motor driving loop responsible for servocontrolling an internal torque setpoint. On the basis of a torque setpoint coming from outside the inverter (action of the driver of the vehicle, possibly via a vehicle supervisor), and by measuring a current drawn (in traction mode) or injected (in regenerative braking mode) on the electrical energy source, of consumption to be observed, the present invention makes it possible to adapt the actual motor torque setpoint in order to observe a maximum current that can be accepted by the electrical energy source. Although the invention has been described with reference to a synchronous motor, with a resolver, it can also be applied to the driving of an asynchronous motor; it can also be applied to the driving of a synchronous motor without having to use a relative position sensor to obtain the position of the rotor relative to the stator (resolver); it can also be applied with or without measuring the power supply voltage, while applying the essential elements of the invention, reviewed above. Finally, by virtue of an inverter power supply current measurement and a regulator acting on a quantity indicative of the power consumed (or injected) on the source, the inverter allows for an excellent, very fine, highly reactive control of the current on the electrical power supply line.

The invention claimed is:

1. An inverter for driving an AC electric motor that includes a stator having at least two phases and a rotor, the inverter comprising:
    a plurality of connection terminals configured to connect to a DC bus associated with a DC electrical energy source and a DC electric voltage;
    an AC generator configured to deliver a current to a terminal block that is to be connected to phases of the AC electric motor;
    a power supply line positioned between the connection terminals and the AC generator;
    a power supply current measurement line on which circulates a measurement of current on the power supply line;
    a plurality of motor current measurement lines on which circulate measurements of alternating current on a plurality of the phases of the AC electric motor, to enable alternating current circulating in each of the plurality of the phases to be known;
    a first input configured to receive information that includes at least one source limit current value, which corresponds to the current on the power supply line, and a driving torque setpoint (Ccons) obtained from a torque demand setpoint (C CAN); and
    a controller configured to receive the measurement of current on the power supply line, the alternating current circulating in each of the plurality of the phases of the AC electric motor, maximum and minimum limit currents of the DC electrical energy source, the torque demand setpoint (C CAN), and the driving torque setpoint (Ccons),
    wherein the controller drives phase currents of the AC electric motor according to the torque demand setpoint (C CAN) by keeping a current flowing in the power supply line at a value compatible with the limit currents of the DC electrical energy source,
    wherein, in order to drive the phase currents of the AC electric motor, the controller is configured to:
        receive the measurement of the voltage on the power supply line and the signal from the resolver,
        determine a driving torque (Cpil) for the AC electric motor to drive the phase currents of the AC electric motor, so that the driving torque (Cpil) is identical to the driving torque setpoint (Ccons) when the current on the power supply line is different from the limit currents of the DC electrical energy source, and, if the current on the power supply line reaches any of the limit currents of the DC electrical energy source, the driving torque (Cpil) is reduced relative to the driving torque setpoint (Ccons) so as not to exceed any of the limit currents of the DC electrical energy source on the power supply line, and
    wherein, when the current on the power supply line reaches a limit current of the DC electrical energy source, the driving torque (Cpil) is reduced relative to the driving torque setpoint (Ccons) by a difference torque (Ct) with a value proportional to an overshoot of the limit current of the DC electrical energy source.

2. The inverter according to claim 1,
    wherein the AC motor is a synchronous motor,
    wherein the rotor is associated with a resolver that gives a relative position between the rotor and the stator,
    wherein the inverter further comprises:
        a power supply voltage measurement line on which circulates a measurement of voltage on the power supply line; and
        a second input configured to receive a signal delivered by the resolver.

3. The inverter according to claim 1, further comprising:
    a current sensor of the power supply line, the current sensor being configured to deliver a measurement to the power supply current measurement line;
    a voltage sensor of the power supply line, the voltage sensor being configured to deliver a measurement to the power supply voltage measurement line;
    a plurality of AC current sensors on the plurality of the phases of the AC electric motor, the AC current sensors being configured to deliver measurements to the plurality of motor current measurement lines.

4. The inverter according claim 1, further comprising a driving stage configured to receive driving commands from the controller, and to drive power transistors of the AC current generator.

5. The inverter according claim 1, wherein the maximum limit current of the DC electrical energy source includes:
    a maximum current setpoint of positive current sign, corresponding to a current drawn from the DC electrical energy source when the AC electric motor is operating in traction mode, and
    a minimum current setpoint of a negative current sign, corresponding to a current returned to the DC electrical energy source when the AC electric motor is operating in regenerative braking mode.

6. The inverter for according to claim 5, wherein the controller includes:
    a first processing line configured to receive the maximum current setpoint,
    a second processing line configured to receive the minimum current setpoint, and
    a switch module for switching over between the first processing line and the second processing depending on the current sign.

7. The inverter according to claim 1, wherein the controller includes a torque ramp block configured to receive the torque demand setpoint (C CCAN) and to deliver the driving torque setpoint (Ccons).

8. The inverter according to claim 1, wherein the AC electric motor is used for traction in an electric vehicle.

9. The inverter according to claim 1, wherein the DC electrical energy source is a battery.

10. The inverter according to claim 1, further comprising a motor driving loop that includes:
- means for receiving the torque demand setpoint (C CAN) coming from outside the inverter,
- means for measuring a current drawn or injected on the DC electrical energy source, and
- means for adapting, based on the received torque demand setpoint (C CAN) and the current drawn, the driving torque setpoint (Ccons).

11. A process for checking torque consistency in an AC electric motor driven by an inverter that includes: a plurality of connection terminals configured to connect to a DC bus associated with a DC electrical energy source and a DC electric voltage; an AC generator configured to deliver a current to a terminal block that is to be connected to phases of the AC electric motor; a power supply line positioned between the connection terminals and the AC generator; a power supply current measurement line on which circulates a measurement of current on the power supply line; a plurality of motor current measurement lines on which circulate measurements of alternating current on a plurality of the phases of the AC electric motor, to enable alternating current circulating in each of the plurality of phases to be known; a first input configured to receive information that includes at least one source limit current value, which corresponds to the current on the power supply line, and a driving torque setpoint (Ccons) obtained from a torque demand setpoint (CCAN); and a controller configured to receive the measurement of current on the power supply line, the alternating current circulating in each of the plurality of the phases of the AC electric motor, maximum and minimum limit currents of the DC electrical energy source, the torque demand setpoint (C CAN), and the driving torque setpoint (Ccons), wherein the controller drives phase currents of the AC electric motor according to the torque demand setpoint (C CAN) by keeping a current flowing in the power supply line at a value compatible with the limit currents of the DC electrical energy source, the process comprising steps of:
- measuring a current and a voltage on the power supply line of the inverter;
- determining, from measurements of the current and the voltage, an electrical power consumed at the input of the inverter;
- determining, by subtracting a plausible losses value, a mechanical power from the electrical power consumed;
- determining, from the mechanical power determined and a motor shaft rotation speed, a mechanical torque on an output shaft of the AC electric motor;
- comparing the mechanical torque to the driving torque setpoint (Ccons) to obtain a difference;
- activating a warning in a case where the difference exceeds a predetermined threshold; and
- reducing the mechanical torque relative to the driving torque setpoint (Ccons) by a difference torque (Ct) in a case where the difference exceeds the predetermined threshold, wherein the difference torque (Ct) has a value proportional to an overshoot of a limit current of the DC electrical energy source.

12. The inverter according to claim 1, wherein the difference torque (Ct) is determined using a proportional integrator regulator of the controller.

* * * * *